United States Patent [19]

Smith

[11] Patent Number: 5,082,026
[45] Date of Patent: Jan. 21, 1992

[54] PIPELINE PLUGGER

[76] Inventor: Garland Y. Smith, 605 Lakeside Dr., Hinsdale, Ill. 60521

[21] Appl. No.: 15,157

[22] Filed: Feb. 17, 1987

[51] Int. Cl.⁵ ............................................. F16L 55/10
[52] U.S. Cl. ...................................... 138/94; 138/89; 137/318
[58] Field of Search .................... 138/89, 93, 94; 137/317, 318

[56] References Cited

U.S. PATENT DOCUMENTS

| | | | |
|---|---|---|---|
| 411,978 | 10/1889 | Chisholm | 138/94 |
| 2,812,778 | 11/1957 | Ver Nooy | 138/94 |
| 2,886,068 | 5/1959 | Ver Nooy | 138/94 |
| 2,906,295 | 9/1959 | Ver Nooy | 138/94 |
| 3,025,885 | 3/1962 | Ver Nooy | 138/94 |
| 3,049,333 | 8/1962 | Wright et al. | 138/94 |
| 3,626,475 | 12/1971 | Hicks | 138/94 |
| 4,628,955 | 12/1986 | Smith | 138/94 |

Primary Examiner—James E. Bryant, III
Attorney, Agent, or Firm—Anthony S. Zummer

[57] ABSTRACT

The present invention relates to a pipeline plugger for mounting on a pipe which pipe has an insertion port. The pipeline plugger includes a housing adapted for mounting on the pipe adjacent to the insertion port. A rod is mounted in the housing and is axially movably transverse to the axis of the pipe. The rod has a carrier block connected to one end. A holding pin is mounted on the carrier block substantially opposed to the rod. The pipe has a pin aperture substantially opposite to the insertion port. The pin aperture is adapted to receive the pin. A plug is pivotally connected to the carrier block. The plug is adapted to be selectively positioned in the pipe to stop the flow of fluid through the pipe past the plug.

16 Claims, 4 Drawing Sheets

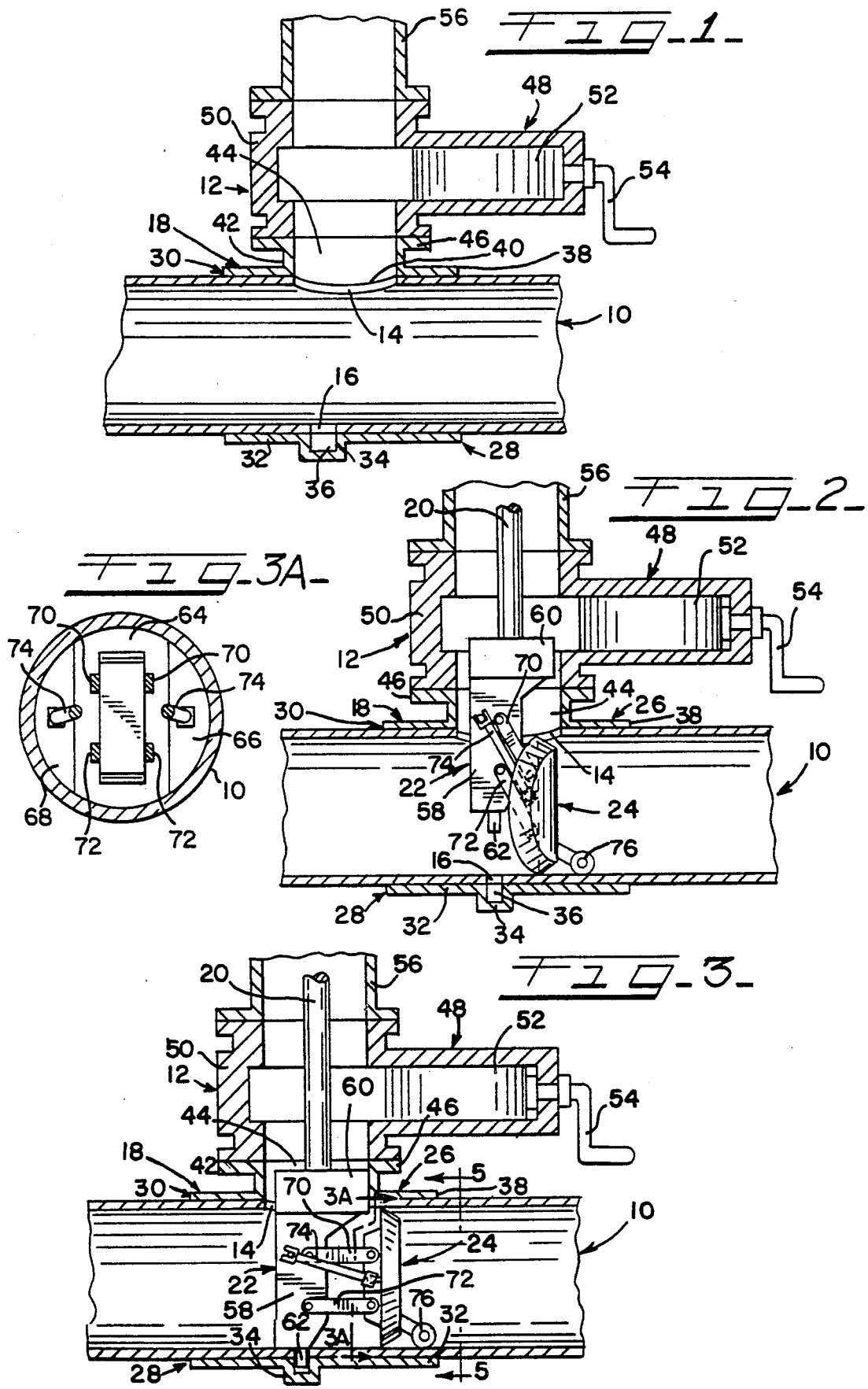

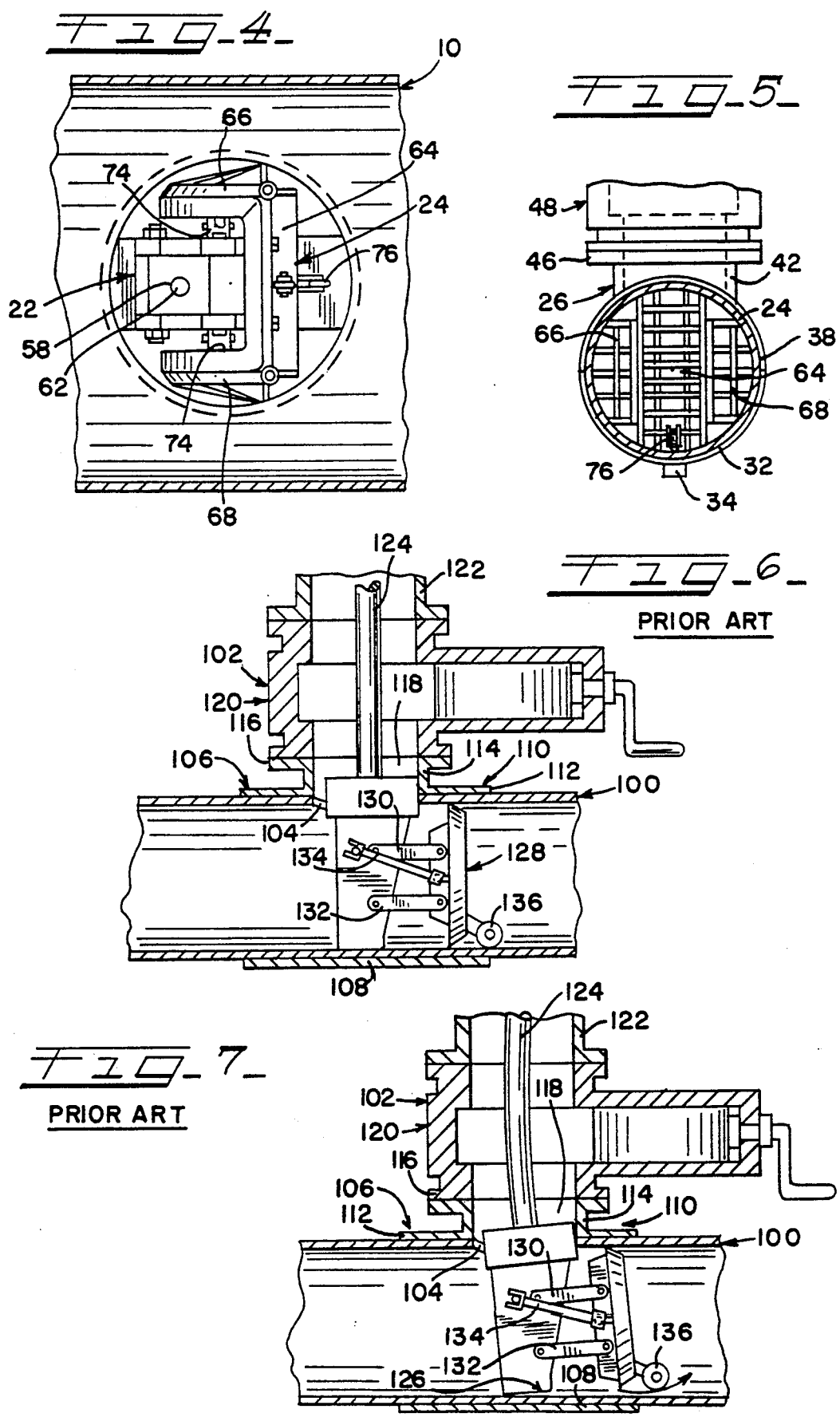

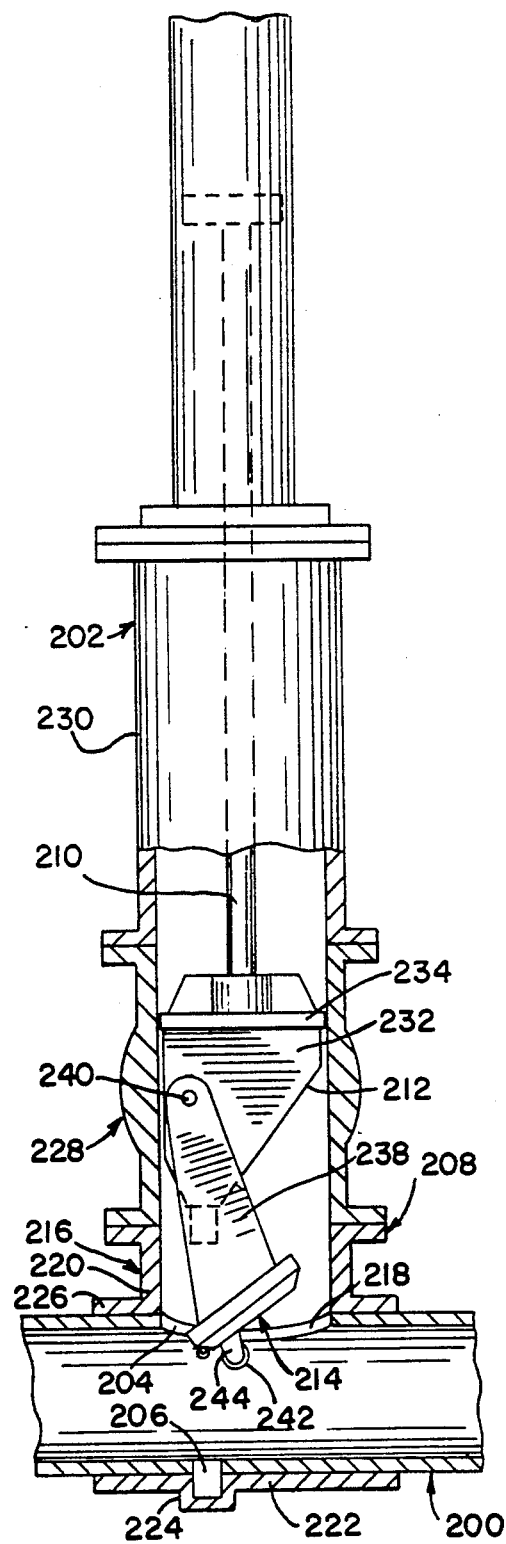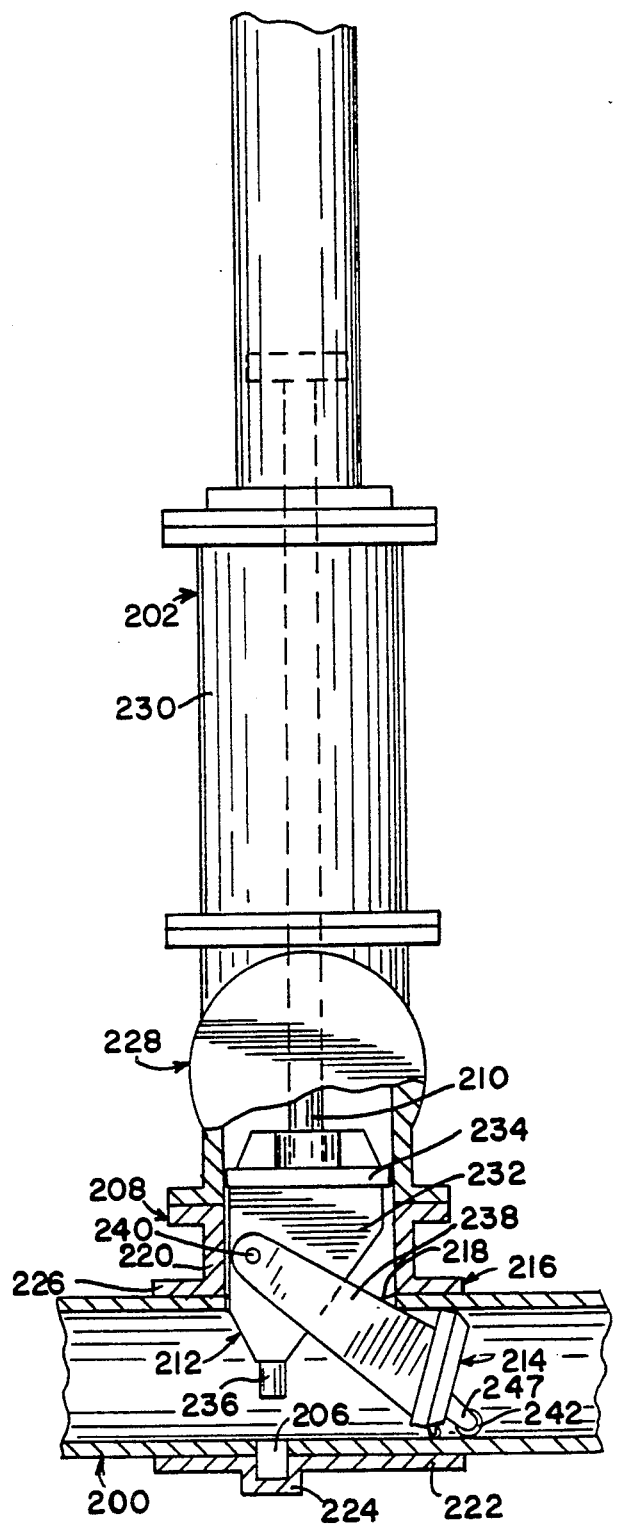

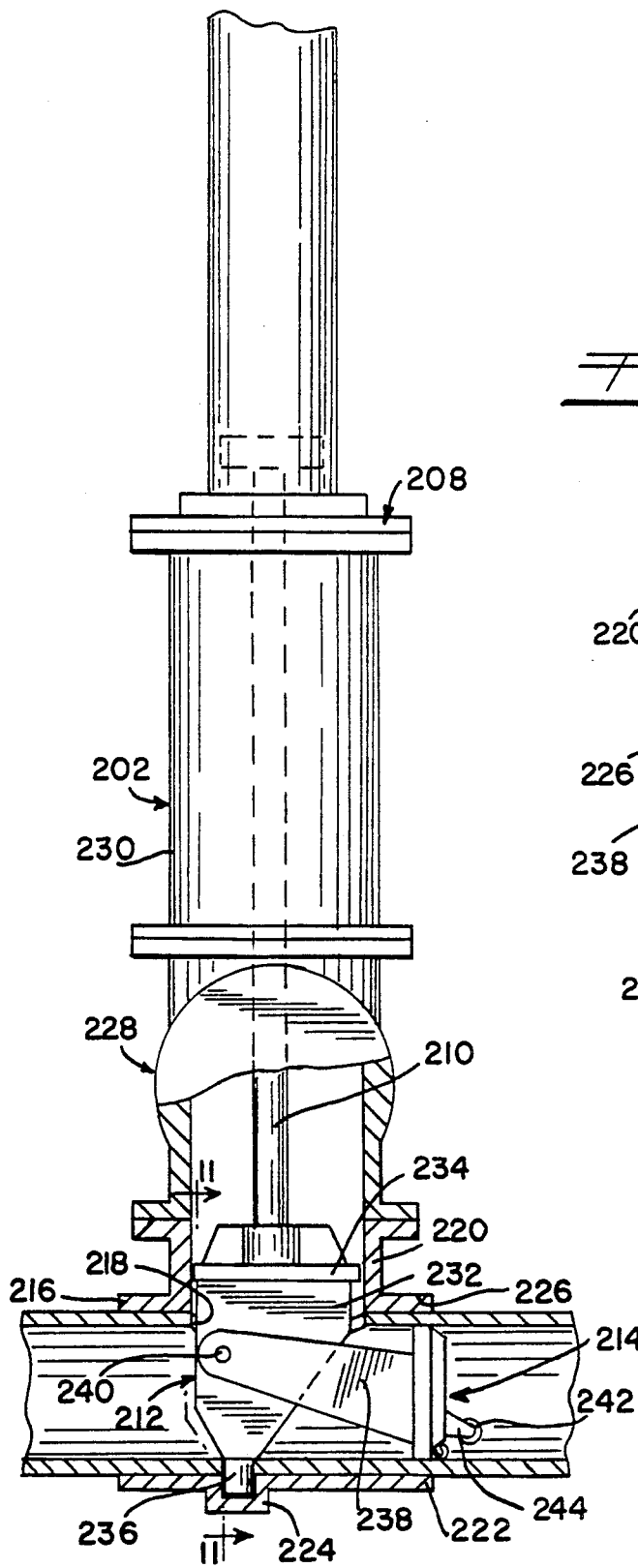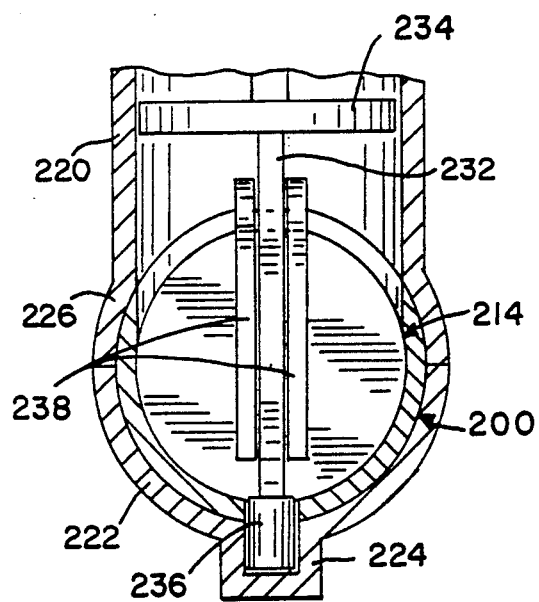

PIPELINE PLUGGER

BACKGROUND OF THE INVENTION

Pipelines are used for a variety of purposes, such as, carrying steam, oil, water and other fluids. In certain instances, it is desirable to interrupt the flow of a fluid through a given pipeline without shutting down an entire system. For instance, it may be desirable to make repairs on a section of pipeline or to replace equipment in a section of pipeline.

An accepted apparatus for interrupting the flow of fluid through a pipeline is in a pipeline plugger such as that shown in U.S. Pat. No. 2,812,778, issued Nov. 12, 1957, to B. Ver Nooy, and entitled, "Pipe Line Plugger". That particular pipeline plugger moves a plug through a small housing into a pipeline, the plug then expands within the pipe to plug the pipeline. The plug is held in place against the force of the fluid in the pipeline by the positive engagement of a plug carrier within the pipe at an insertion opening and frictional engagement of the plug carrier with the interior of the pipe. Another pipeline plugger is disclosed in U.S. Pat. No. 3,025,885, issued Mar. 20, 1962, to B. Ver Nooy, and entitled, "Pipe Line Plugger". The second pipeline plugger patent discloses a plug which is not collapsible, and requires a housing having substantially the same interior size as the interior of the pipe to be plugged. It has been found that one of the problems with pipeline pluggers, such as, those taught in the two Ver Nooy patents is that the force applied to the plug by the fluid sets up a couple with the reaction of the carrier on the pipe which causes the carrier to overcome the frictional force between the carrier and the interior of the pipe to allow the carrier to skid on the inside of the pipe, and thus allow the plug to tilt substantially in the pipe. The tilting of the plug breaks the seal between opposed edges of the plug to allow fluid to pass by the edges of the plug and have a leak. One method of solving the problem is to expand the plug to deform the pipe and thereby hold the plug in position. This construction is disclosed in U.S. Pat. No. 3,626,475, issued Dec. 7, 1971, to D. J. Hicks, and entitled, "High Temperature Pipe-Plugging Apparatus". The concept of using some sort of pins or auxillary holding devices embedded in the pipe or conduit is taught in U.S. Pat. No. 4,344,460, issued Aug. 17, 1982, to I. Galos, entitled, "Apparatus For Plugging A Pressure Piping System", and U.S. Pat. No. 4,483,457, issued Nov. 20, 1984, to Schukei et. al. entitled, "Hinged Steam Generator Nozzle Plug". U.S. Pat. No. 2,886,068, issued May 12, 1959, to B. Ver Nooy, and entitled, "Pipe Line Plugger" discloses a pipeline plugger construction wherein a plug is connected to a shaft which has right and left hand threads which are connected through nuts and linkage arms to extend a plug into a pipe. This pipeline plugger eliminates the skidding problem, however presents other problems in positioning the shaft perfectly to have the plug enter the pipe to be plugged.

It is an object of the present invention to provide a pipeline plugger which has a simple construction but which is effective in eliminating the skidding problem so that there is no leakage in the pipe past the plug.

SUMMARY OF THE INVENTION

The present invention relates to an improved pipeline plugger which is adapted for mounting on a pipe having an insertion port. The pipeline plugger includes a housing adapted for mounting on the pipe adjacent to the insertion port. The plugger includes a rod which is axially movably mounted in the housing, and the movement of the rod is substantially perpendicular to the longitudinal axis of the pipe. A carrier block is connected to one end of the rod. The block is insertable into the pipe through the insertion port. A holding pin is mounted on the carrier block substantially opposed to the rod. The pipe has a pin aperture opposite to the insertion port. A plug is pivotally connected to the carrier block. The plug is adapted to be positioned in the pipe to stop the flow of fluid past the plug through the pipe. The holding pin is positionable in the pin aperture when the plug is in the pipe to prevent the carrier block from moving along the longitudinal axis of the pipe and allow the plug to tilt to allow leakage past the plug.

BRIEF DESCRIPTION OF THE DRAWINGS

FIG. 1 is a cross sectional view of a portion of a pipe having an insertion port and a pin aperture with a housing of the subject pipeline plugger mounted on the pipe;

FIG. 2 is a cross sectional view similar to FIG. 1 but with a rod and carrier block shown positioned in the housing and a foldable plug connected to the carrier block positioned in the pipe for sealing insertion into the pipe;

FIG. 3 is a cross sectional view similar to FIG. 2 but showing the carrier block in its lowered and locked position and the plug in its sealing position;

FIG. 3A is an enlarged cross sectional view taken on line 3A—3A of FIG. 3.

FIG. 4 is a bottom view of the plug;

FIG. 5 is a cross sectional view taken on Line 5—5 of FIG. 3;

FIG. 6 is a prior art construction showing a cross sectional view similar to FIG. 3 showing a carrier block without a holding pin;

FIG. 7 is a prior art construction similar to FIG. 6 but showing the attitude of the parts when skidding of the carrier block occurs to allow the plug to tilt and thereby allow fluid to flow past the plug;

FIG. 8 is a cross sectional view of another form of the pipeline plugger including a plug which is not foldable and the plug is in a position for insertion into a pipeline;

FIG. 9 is similar to FIG. 8 but showing the plug in a partially inserted attitude;

FIG. 10 is similar to FIGS. 8 and 9 but showing the plug in a fully inserted attitude and a carrier block in a locked position; and FIG. 11 is a cross sectional view taken on Line 11—11 of FIG. 10.

DESCRIPTION OF THE PREFERRED EMBODIMENT

Referring now to the drawings and especially FIGS. 1, 2 and 3, a portion of a conventional straight pipe having a straight longitudinal axis and a circular cross section is shown therein and is generally indicated by numeral 10. A pipe plugger 12 which is a specific embodiment of the present invention is mounted on the pipe for selectively stopping the flow of a fluid through the pipe.

Pipe 10, which is a conventional pipe, has a circular insertion port 14 formed therein. The insertion port is formed in the pipe by a conventional and well known method wherein a circular cutter removes a coupon from the pipe thereby forming an opening in the sidewall of the pipe. The pipe also includes a circular pin aperture 16 extending through the sidewall of the pipe. Pin aperture 16 is positioned opposite to insertion port 14. Pin aperture 16 has its axis substantially perpendicular to the longitudinal axis of the pipe. The pin aperture is formed in the pipe by removing a smaller coupon from the pipe in a conventional and well known manner.

Pipe plugger 12 generally includes a housing 18 mounted on pipe 10 surrounding insertion port 14 and pin aperture 16. A rod 20 is mounted in the housing with a carrier block 22 secured to the rod. A conventional plug 24 is pivotally connected to carrier block 22. Conventional actuator means, which is not shown herein, is connected to the rod for selectively moving the rod.

Housing 18 includes a saddle 26 which is sealingly welded to the exterior of pipe 10. The saddle includes a receptacle portion 28 positioned adjacent to the pin aperture and a nozzle portion 30 positioned adjacent to the insertion port. The receptacle portion includes a receptacle body 32 which has a semicircular cross section which may be seen best in FIG. 5. The interior of the receptacle body conforms to the outer surface of pipe 10. The receptacle body includes a circular receptacle 34 with a circular receptacle cavity 36 which is aligned with pin aperture 16. The nozzle portion includes a nozzle body 38 which has a semicircular cross section as may be seen in FIG. 5. The interior of the nozzle body conforms to the exterior of pipe 10. The nozzle body includes a nipple aperture 40 which is aligned with insertion port 14. A nozzle 42 is mounted on nozzle body 38 and has a central opening 44 aligned with nozzle aperture 40. The nozzle includes a conventional mounting flange 46 formed on one end of the nozzle.

A conventional gate valve 48 is mounted on saddle 26. The gate valve is conventional in construction in that it includes a gate housing 50 with a gate valve body 52 slideably mounted therein. The gate valve body is moved in the gate housing by conventional operation of crank 54. A conventional rod housing 56 is mounted on top of the gate valve housing as viewed in FIGS. 1, 2 and 3.

Carrier block 22 includes a carrier block frame 58 with a carrier block flange 60 fixed thereon. Rod 20 has one end secured to flange 60. A right circular cylindrical holding pin 62 is fixed to frame 58 on the side opposite to flange 60. Holding pin 62 is positionable in pin aperture 16 and in cavity 36 of receptacle 34 to prevent movement of carrier block 22 along the longitudinal axis of pipe 10.

Plug 24 is of a conventional construction having a center body 64 with a pair of wings 66 and 68 hingedly mounted on the center body. The center body is hingedly connected to frame 58 by a pair of parallel upper arms 70. A second pair of parallel lower arms 72 also connects the center body with frame 58. Arms 72 are parallel to arms 70. A conventional strut 74 is connected to each of the wings 66 and 68. A roller 76 is mounted on the center body 64 for engagement with the interior of the pipe to facilitate movement of plug 24 along the interior of the pipe.

Referring now to FIGS. 6 and 7 which disclose prior art construction wherein a conventional circular pipe 100 is shown with a pipe plugger 102 mounted thereon. Pipe 100 has an insertion port 104 formed therein which is identical to insertion port 40.

Pipe plugger 102 includes a saddle 106 sealingly welded to pipe 100 surrounding insertion port 104. Saddle 106 includes a base portion 108 which has a semicircular cross section similar to the cross section of receptacle portion 28 to conform to the outer surface of pipe 100. Saddle 106 includes a nozzle portion 110 which includes a nozzle body 112. The construction of nozzle portion 110 is identical to the construction of nozzle portion 30. The nozzle portion 110 includes a nozzle 114 with a flange 116. The nozzle portion has an opening 118 which is aligned with insertion port 104. A gate valve 120 is mounted on the nozzle portion which gate valve is conventional and identical in construction to gate valve 48. A rod housing 122 is mounted on the gate valve and is identical to rod portion 56.

A rod 124 is movably mounted in housing 102 and is axially movable through the nozzle portion in a direction transverse to the longitudinal axis of pipe 100. A carrier block 126 is fixed to one end of rod 124. The carrier block has a conventional plug 128 pivotally mounted thereon.

Plug 128 has the same construction as plug 24 in that it includes a center body and a pair of wings. The center body is connected to carrier block 126 by a pair of parallel upper arms 130 which are pivotally connected at one end to the carrier block and at the other end to the center body. A second pair of parallel arms 132 is pivotally connected to carrier block 126 and the center body. Second arms 132 are parallel to arms 130. Plug 128 includes a pair of struts 134. Each strut 134 has one end pivotally connected to the carrier block and the other end to one of the wings of plug 128. Plug 128 has a roller 136 mounted thereon.

Plug 128 is inserted into pipe 100 by moving the carrier block with the plug downward through gate valve 120 until roller 136 engages the interior of pipe 100. Further axial movement of rod 124 transverse to the longitudinal axis of pipe 100 moves the plug inward toward the pipe. As the carrier block moves downward, arms 130 and 132 are pivoted to move plug 128 longitudinally axially inward to pipe 100. Simultaneously, struts 134 force the wings outward until the wings are coplanar with the center body and thereby form a stopper in the pipe to prevent the flow of fluid through the pipe.

It has been found that the construction shown in FIGS. 6 and 7 allows leakage to occur in certain instances. It has been found that the leakage occurs because the pressure of the fluid in the pipe applied to the plug from the side of the plug which is connected to the carrier block creates a couple. The plug is prevented from moving further along the pipe by engagement of the upper portion of the carrier block with the pipe and the nozzle as viewed in FIG. 6. In certain instances, the force applied to the plug is sufficiently great to cause that portion of carrier block 126 in engagement with the interior of the pipe to skid along the pipe. In those instances, the force is often great enough to bend rod 124. The mechanics which occurs is that connection of lower arms 132 is then positioned closer inward to the pipe than the upper arms 130 so that the plug is tilted. The tilting of the plug then allows fluid to flow between the plug and the bottom of the interior of the pipe as viewed in FIGS. 6 and 7 thereby creating a leak.

The present improved pipe plugger 12 described hereinabove and shown in FIGS. 1 through 5 includes receptacle 34 on the receptacle portion which is aligned with pin aperture 16. Holding pin 62 is fixed to carrier block 22 on the side opposite to which rod 20 is fixed. When plug 24 is inserted into pipe 10, the carrier block with the plug moves downward through the nozzle portion until roller 76 engages the interior of pipe 10 as shown in FIG. 2. As rod 20 is continued to be moved axially through the housing and transverse to the longitudinal axis of pipe 10, arms 70 and 72 pivot on carrier block 22 to move plug 24 inward into pipe 10. Simultaneously, struts 74 swing wings 66 and 68 outward to form a seal between the plug and the interior of the pipe. Continued movement inward of carrier block 22 into pipe 10 positions holding pin 62 into the pin aperture and into the cavity of receptacle 34. Once the carrier block is into full engagement with the interior of pipe 10, the holding pin is seated in the receptacle.

Looking now to FIG. 3, it may be seen that when a pressure is applied by the fluid to plug 24 on the side of the plug adjacent to the carrier block, there is a couple formed by the force on the plug and the engagement of the carrier block with the pipe at the insertion port and the nozzle. The holding pin prevents the lower portion of the carrier block from being moved away from the insertion port in the pipe since holding pin 62 is a positive lock which holds the carrier block in position. Thus, the holding pin prevents the carrier block from skidding along the interior of pipe 10 and thereby allow the plug to tilt to cause a leak.

Referring now to FIGS. 8 through 11, a form of pipeline plugger is shown therein wherein a plug does not fold and is simply connected to a carrier at a single pivot. A conventional straight pipe having a circular cross section, generally indicated by numeral 200, is shown with a pipeline plugger 202 mounted on the pipe for selectively stopping the flow of fluid through the pipe. Pipe 200 has a circular insertion port 204 formed therein. The diameter of the insertion port 204 is equal to or slightly less than the diameter of pipe 200. A pin aperture 206 is formed in the pipe opposite the insertion port.

Pipe plugger 202 generally includes a housing 208 mounted on pipe 200 surrounding insertion port 204 and pin aperture 206. A rod 210 is mounted in the housing and is axially movable through the housing in a direction transverse to the longitudinal axis of pipe 200. A carrier block 212 is secured to one end of the rod. A plug 214 is pivotally connected to carrier block 212.

Housing 208 includes a saddle 216 which is sealingly welded to pipe 200. The saddle includes an insertion opening 218 which is aligned with the insertion port. A nozzle 220 is positioned adjacent to the insertion port. The nozzle has an opening aligned with the insertion port. The saddle includes a receptacle portion 222 with a receptacle 224 formed therein and aligned with the pin aperture. The receptacle portion conforms to the outer surface of the pipe so that the receptacle portion may be sealingly secured to the pipe. Nozzle portion 216 includes a nozzle body 226 which conforms to the pipe 200.

A conventional gate valve 228 is mounted on the nozzle portion. The gate valve is substantially identical to gate valve 48 described in connection with pipe plugger 12. A rod housing 230 is mounted on the gate valve for receiving rod 210.

Carrier block 212 includes a carrier block frame 232 with a carrier block flange 234 fixed thereon. Rod 210 has one end secured to flange 234. A right circular cylindrical holding pin 236 is mounted on the side of the carrier flange 232 opposite the side to which rod 210 is connected. Holding pin 236 is positionable in pin aperture 206 and receptacle 224. The holding pin positioned in the pin aperture and in the receptacle prevents movement of the carrier block along the longitudinal axis of pipe 200.

Plug 214 is of conventional construction and is hingedly connected to the carrier block with a pair of plug arms 238. Each of the plug arms has one end fixed to plug 214 and the other end pivotally connected to the carrier block frame at pivot pin 240. Plug 214 includes a roller 242 which is mounted on the plug by a pair of ears 244.

Instant pipe plugger 202 operates in the same manner in which pipe plugger 12 operates with the exception that plug 214 is solid and does not have any hingedly mounted wings. Rod 210 moves inward to move the carrier block with plug 214 through gate valve 228 and into pipe 200. As the rod pushes the carrier block in the pipe, roller 242 engages the interior of pipe 200. Continued inward movement of the carrier block forces the plug to move inward along the longitudinal axis into pipe 200. The positioning of pivot 240 on the carrier block relative to the length of arms 238 is such that when the carrier block is positioned fully into the pipe, the plug is positioned in an attitude in which the plug is substantially perpendicular to the longitudinal axis of the pipe so that the plug seals the pipe. When the carrier block is fully positioned in the pipe, pin 236 is positioned in pin aperture 202 and receptacle 224.

When the fluid is allowed to flow through pipe 200, pressure of the fluid is applied to plug 214. The carrier block is held securely in its position in pipe 200 so that there is no skidding of the carrier block within the pipe which allows the plug to tilt and thereby allow the fluid to pass by the plug to create a leak.

It may be appreciated that by the addition of the holding pin and the forming of the pin aperture and the receptacle for the pin in the saddle, the problem of skidding of the pipe plugger is effectively eliminated, thereby eliminating leaks.

Although the instant invention has been shown and described in detail above, it is readily apparent that those skilled in the art may make various modifications and changes in the present invention without departing from the spirit and scope of the instant invention. It is to be expressly understood that the instant invention is limited only by the appended claims.

What is claimed is:

1. A pipeline plugger for mounting in cooperation with a pipe having a longitudinal axis and an insertion port for selectively sealing closed the pipe, said pipe having a pin aperture substantially opposite to the insertion port, said pipeline plugger comprising, in combination, a housing adapted for mounting on the pipe adjacent to the insertion port, a rod axially movably mounted in the housing, a carrier block connected on one side to one end of the rod and being insertable into the pipe through the insertion port, a holding pin mounted on the carrier block on a side opposite to the side connected to the rod, said holding pin being adapted for positioning in the pin aperture of the pipe, and a plug pivotally connected to the carrier block, said plug being adapted to be positioned in the pipe to stop the flow of fluid past the plug through the pipe.

2. A pipeline plugger for mounting in cooperation with a pipe having a longitudinal axis and an insertion port for selectively sealing closed the pipe as defined in claim 1; wherein said housing includes a receptacle on the side of the pipe opposite to the insertion port, said receptacle being positionable adjacent to the pin aperture and being adapted to receive a portion of the holding pin.

3. A pipeline plugger for mounting in cooperation with a pipe having a longitudinal axis and an insertion port for selectively sealing closed the pipe as defined in claim 1, including; a pair of arms connecting the plug to the carrier block, each of said arms being connected to the plug at one end, the opposite end of each of said arms being pivotally connected to the carrier block.

4. A pipeline plugger for mounting in cooperation with a pipe having a longitudinal axis and an insertion port for selectively sealing closed the pipe as defined in claim 1, including; a roller mounted on the plug for engagement with the interior of the pipe, said roller facilitating the movement of the plug along the interior of the pipe.

5. A pipeline plugger for mounting in cooperation with a pipe having a longitudinal axis and an insertion port for selectively sealing closed the pipe as defined in claim 1, said housing including, a receptacle mounted on the side of the pipe opposite to the insertion port, said receptacle being positionable adjacent to the pin aperture, said receptacle being adapted to receive a portion of the holding pin to prevent movement of the carrier block along the axis of the pipe, and a pair of arms connecting the plug to the carrier block, each of said arms having one end connected to the plug and the other end pivotally connected to the carrier block.

6. A pipeline plugger for mounting in cooperation with a pipe having a longitudinal axis and an insertion port for selectively sealing closed the pipe as defined in claim 1; said housing including a receptacle mountable on the side of the pipe opposite to the insertion port, said receptacle being positionable adjacent to the pin aperture, said receptacle being adapted to receive the holding pin for holding the carrier block against movement along the axis of the pipe, and a roller rotatably mounted on the plug and being engageable with the interior of the pipe to facilitate movement of the plug along the axis of the pipe.

7. A pipeline plugger for mounting in cooperation with a pipe having a longitudinal axis and an insertion port for selectively sealing closed the pipe as defined in claim 1, including; a pair of arms connecting the plug with the carrier block, each of said arms having one end connected to the plug and the other end pivotally connected to the carrier block, and a roller rotatably mounted on the plug and being adapted for engagement with the interior of the pipe to facilitate movement of the plug along the pipe.

8. A pipeline plugger for mounting in cooperation with a pipe having a longitudinal axis an insertion port for selectively sealing closed the pipe as defined in claim 1; said housing including a receptacle positionable on a side of the pipe opposite to the insertion port, said receptacle being positionable adjacent to the pin aperture, said receptacle being adapted for receiving the holding pin to prevent movement of the carrier block axially in the pipe, a pair of arms pivotally connecting the plug to the carrier block, each of said arms including one end connected to the plug and the opposite end pivotally connected to the carrier block, and a roller rotatably mounted on the plug engageable with the interior of the pipe to facilitate movement of the plug axially within the pipe.

9. A pipeline plugger for mounting in cooperation with a pipe having a longitudinal axis and an insertion port for selectively sealing closed the pipe as defined in claim 1; wherein said plug includes a center body being pivotally connected to the carrier block, and a pair of wings hingedly connected to the center body to allow insertion of the plug through a housing having a diameter smaller than the diameter of the interior diameter of the pipe.

10. A pipeline plugger for mounting in cooperation with a pipe having a longitudinal axis and an insertion port for selectively sealing closed the pipe as defined in claim 9; said housing having a receptacle mountable on a side of the pipe opposite to the insertion port, said receptacle being positionable adjacent to the pin aperture, said receptacle being adapted for receiving the holding pin to prevent movement of the carrier block along the axis of the pipe.

11. A pipeline plugger for mounting in cooperation with a pipe having a longitudinal axis and an insertion port for selectively sealing closed the pipe as defined in claim 9, including; a first pair of arms pivotally connecting the plug to the carrier block, each of the arms of the first pair of arms having one end pivotally connected to the center body of the plug and the other end connected to the carrier block, a second pair of arms parallel to the first pair of arms pivotally connecting the plug to the carrier block, each of the arms of the second pair of arms having one end pivotally connected to the center body and the other end pivotally connected to the carrier block, each of said arms of the second pair being parallel to each other and to the arms of the first pair, and a strut connecting each of the wings to the carrier block, each strut having one end pivotally connected to its respective wing and the other end pivotally connected to the carrier plug.

12. A pipeline plugger for mounting in cooperation with a pipe having a longitudinal axis and an insertion port for selectively sealing closed the pipe as defined in claim 9, including; a roller rotatably mounted on the center body and being engageable with the interior of the pipe to facilitate movement of the plug axially along the interior of the pipe.

13. A pipeline plugger for mounting in cooperation with a pipe having a longitudinal axis and an insertion port for selectively sealing closed the pipe as defined in claim 9; said housing including a receptacle mountable on the pipe opposite to the insertion port, said receptacle being positionable adjacent to the pin aperture, said receptacle being adapted to receive the holding pin to prevent movement of the carrier block along the axis of the pipe, a pair of parallel arms, each of said arms having one end pivotally connected to the center body and the other end pivotally connected to the carrier block, a second pair of parallel arms, each of said arms of the second pair having one end pivotally connected to the center body and the other end pivotally connected to the carrier block, said second pair of arms being parallel to the first arms, and a strut connected to each of the wings, each strut having one end pivotally connected to its respective wing and the other end pivotally connected to the carrier block.

14. A pipeline plugger for mounting in cooperation with a pipe having a longitudinal axis and an insertion port for selectively sealing closed the pipe as defined in claim 9, including; a first pair of parallel arms, each of said arms having one end pivotally connected to the center body and the other end connected to the carrier block, a second pair of parallel arms parallel to the first pair of parallel arms, each of said arms of the second pair having one end pivotally connected to the center body and the other end pivotally connected to the carrier block, a strut pivotally connected to each of the wings, each strut having one end pivotally connected to its respective wing and the other end pivotally connected to the carrier block, and a roller rotatably mounted on the center body and being rotatably mounted on the center body and being rotatably engageable with the interior of the pipe to facilitate movement of the plug along the axis of the pipe.

15. A pipe line plugger for mounting in cooperation with a pipe having a longitudinal axis and an insertion port for selectively sealing closed the pipe as defined in claim 9, said housing including a receptacle mountable on the pipe opposite to the insertion port, said receptacle being positionable adjacent to the pin aperture, said receptacle being adapted to receive the holding pin to prevent movement of the carrier block along the axis of the pipe, and a roller rotatably mounted on the center body and being engageable with the interior of the pipe to facilitate movement of the plug along the axis of the pipe.

16. A pipeline plugger for mounting in cooperation with a pipe having a longitudinal axis and an insertion port for selectively sealing closed the pipe as defined in claim 9, including; a pair of parallel arms, each of said arms having one end pivotally connected to the center body and the other end pivotally connected to the carrier block, a second pair of arms parallel to the first pair of arms, each of the arms of the second pair having one end pivotally connected to the center body and the other end connected to the carrier block, a strut connected to each wing, each strut having one end pivotally connected to the wing and the other end pivotally connected to the carrier block, said housing including a receptacle mountable on the pipe opposite to the insertion port, said receptacle being positionable adjacent to the pin aperture, said receptacle being adapted to receive the holding pin to prevent movement of the carrier block along the axis of the pipe, and a roller rotatably mounted on the center body and being adapted for engagement with the interior of the pipe to facilitate movement of the plug along the axis of the pipe.

* * * * *

UNITED STATES PATENT AND TRADEMARK OFFICE
CERTIFICATE OF CORRECTION

PATENT NO. : 5,082,026
DATED : January 21, 1992
INVENTOR(S) : Garland Y. Smith

It is certified that error appears in the above-identified patent and that said Letters Patent is hereby corrected as shown below:

Claim 8, column 7, line 55, after "axis" insert --and--

Signed and Sealed this

Sixth Day of April, 1993

Attest:

STEPHEN G. KUNIN

Attesting Officer

Acting Commissioner of Patents and Trademarks